United States Patent
Vasey

(10) Patent No.: US 8,234,563 B1
(45) Date of Patent: Jul. 31, 2012

(54) EDITING OF CUSTOMISED DOCUMENTS

(75) Inventor: Philip E. Vasey, Southwold (GB)

(73) Assignee: Business Integrity Limited, London (GB)

( * ) Notice: Subject to any disclaimer, the term of this patent is extended or adjusted under 35 U.S.C. 154(b) by 1056 days.

(21) Appl. No.: 11/855,296

(22) Filed: Sep. 14, 2007

Related U.S. Application Data

(60) Provisional application No. 60/825,731, filed on Sep. 15, 2006.

(51) Int. Cl.
*G06F 17/00* (2006.01)

(52) U.S. Cl. ......... 715/229; 715/253; 715/255; 715/751

(58) Field of Classification Search ............... 715/255, 715/253, 229, 751
See application file for complete search history.

(56) References Cited

U.S. PATENT DOCUMENTS

| | | | |
|---|---|---|---|
| 5,940,830 A * | 8/1999 | Ochitani | 1/1 |
| 7,165,216 B2 * | 1/2007 | Chidlovskii et al. | 715/237 |
| 7,337,388 B2 * | 2/2008 | Barnett et al. | 715/229 |
| 7,506,251 B2 * | 3/2009 | Vasey | 715/255 |
| 2002/0046235 A1 * | 4/2002 | Foy et al. | 709/203 |
| 2004/0060005 A1 * | 3/2004 | Vasey | 715/513 |
| 2004/0133858 A1 * | 7/2004 | Barnett et al. | 715/530 |

FOREIGN PATENT DOCUMENTS

WO    WO 0104772 A2 *    1/2001

* cited by examiner

*Primary Examiner* — Stephen Hong
*Assistant Examiner* — Matthew Ludwig
(74) *Attorney, Agent, or Firm* — Anderson Gorecki & Manaras LLP

(57) ABSTRACT

A method of generating a second customised document incorporating amendments made to a previously generated first document, where the customised documents include one or more selected predetermined portions of document content, comprises the steps of: determining which portions of document content are comprised in the first document but which are not comprised in the second document; deleting the portions of document content determined in the preceding step from the first document; determining which portions of document content are comprised in the second document but which are not comprised in the first document; and copying the portions of document content determined in the preceding step from the second document to the first document.

20 Claims, 3 Drawing Sheets

EDITING OF CUSTOMISED DOCUMENTS

CROSS-REFERENCE TO RELATED APPLICATIONS

A claim of priority is made to U.S. Provisional Patent Application Ser. No. 60/825,731, entitled Editing of Customised Documents, filed 15 Sep. 2006.

FIELD OF THE INVENTION

The present invention relates to the generation of customised documents using document templates or master documents in a document generation system. The present invention relates, in particular, to the generation of documents which are variants of documents which have been edited after being generated by the document generation system.

BACKGROUND OF THE INVENTION

It is known how to create customised documents using document templates or master documents. In our system, customised documents are generated using master documents which contain portions of document content, such as text or images, which are selectively incorporated into the resulting customised documents. For example, portions of document content included in the master document may be included in the final customised document only if certain conditions are satisfied. Such portions of document content may be referred to as conditional document content. The master document may also include portions of document content which are included unconditionally in the final customised document.

In one example, a social services document customised to a particular person who is the subject of the document may be generated from a master document. If the subject is pregnant then the final document may need to include a portion of text relating to the pregnancy. In this case the master document contains a specific text portion relating to pregnancy which is only included in the final customised document if it has been determined that the subject is actually pregnant. The final document may also need to include a standard clause which is included regardless of pregnancy but whose wording differs depending on whether the subject is male or female. In this case, the master document contains two text portions corresponding to the alternative clause wordings. One or the other of the two text portions is selectively included in the customised document depending on whether the subject is male or female.

The information required to generate a customised document may be represented by one or more variables. In the examples given above, a first variable 'Pregnant' which can take one of the two values 'True' or 'False' is used to represent whether the subject is pregnant or not. A second variable 'Gender' which can take one of the two values 'Male' or 'Female' is used to represent the gender of the subject. Some variables may also take numerical values, such as a variable 'Age', text values, such as a variable 'Nationality', or other types of value. In our system, the variables may also take values indicating that the value of a variable is unknown or indefinite.

The variables associated with a master document may be used to form logical statements which may in turn be used to specify the conditions which need to be satisfied for each portion of document content to be included in the customised document. For example, the logical statement Gender IS 'Female' may be formed which evaluates to True if the subject is female and evaluates to False if the subject is male. This logical statement represents the condition which must be satisfied (i.e. evaluate to True) for the standard clause relating to female subjects to be included in the customised document. The simplest logical statement is a variable such as 'Pregnant', which can take the values True and False, appearing on its own. In this case the evaluation of the logical statement is simply the value of the variable. Such a variable, 'Variable', appearing on its own as a logical statement may be considered to be shorthand for Variable IS 'True'. More complicated logical statements may also be formed by combining simpler statements using the logical operators AND, OR and NOT. For example, the logical statement (Gender IS 'Female') AND NOT(Pregnant) may be formed which evaluates to True only if the subject is female and not pregnant. The conditions (in the form of logical statements) which dictate whether particular portions of document content are included in the customised document may be referred to as usage statements.

The way in which portions of document content are incorporated into customised documents may be represented in the form of a mark-up of the master document. For example, a portion of conditional text in the master document may be indicated as such by enclosing the text in square bracket, [ . . . conditional text . . . ]. The usage statement associated with a particular portion of document content is indicated as superscript on the inside of the left-hand bracket associated with the portion of document content, $[^{Usage\ Statement}$ . . . conditional text . . . ]. The conditional document content is included in the customised document only if the usage statement associated with that conditional document content evaluates to True. For example, the mark-up [Gender IS 'Male' Text portion 1 . . . ] indicates that the text 'Text portion 1 . . . ' is included in the customised document only if the subject is male. Similarly, the mark-up $[^{Pregnant}$ Text portion 2 . . . ] indicates that the text 'Text portion 2 . . . ' is included in the customised document only if the subject is pregnant. In the example given above where alternative clause wordings are used depending on whether the subject is male or female, the master document contains $[^{Gender\ IS\ 'Male'}$ Clause wording 1 . . . ] $[^{Gender\ IS\ 'Female'}$ Clause wording 2 . . . ]. The position of the document content in the customised document depends on the position of the document content within the master document.

Variables such as 'Name' or 'Address' may also appear in the text portions. When a variable appears within a portion of text, the variable may be distinguished from the rest of the text by being shown between curly brackets, {variable}. One example of a conditional text portion illustrating this is $[^{Pregnant}$ The mother is {Name} who lives at {Address} . . . ].

Although the examples given above represents one form of mark-up, other forms of mark-up may also be used. Our U.S. patent application Ser. No. 10/434,753, incorporated herein by reference, discloses two different forms of mark-up notation and a system and method for converting a master document written in one mark-up notation to a master document written in a different mark-up notation. More complex mark-up notation may also be used. For example, our International patent applications, publication numbers WO 2005/024653, WO 2005/024654, WO 2005/024656 and WO 2005/024660, incorporated herein by reference, disclose several examples.

In order to generate a fully customised document it is necessary to determine the values of all the relevant variables so that the usage statements can be evaluated which in turn allows a determination to be made as to which of the portions of conditional document content to include in the final customised document. This information may be collected by means of a questionnaire which a user completes to assign values to the variables. In the social services examples given above, a user may be asked a first question enquiring as to the gender of the subject. If relevant, a second question may then be asked enquiring as to whether the subject is pregnant. The questionnaire may be presented to the user in the form of a series of web pages for example in which the user types answers into text boxes or checks tick boxes corresponding to predefined alternative answers.

The questionnaire may be generated automatically by analysing the master document and determining from the mark-up and the variables present which questions to ask. Our International patent applications, publication numbers WO 01/04772 and WO 03/061474, incorporated herein by reference, disclose systems and methods for generating a questionnaire from a master document.

Often, once a customised document has been generated, the customised document needs to be subsequently amended. Typically, a first draft of a customised document is generated using some initial document generation data by a document generation system. For example, in the case that the customised document is a contract, the document generation data may include data specifying the legal jurisdiction governing the contract, such as 'The United States'. The content and form of the customised document depends on the initial document generation data. For example, a contract governed by the laws of the United States may have a different form and different content to an equivalent contract governed by the laws of other countries. In particular, a United States contract may contain clauses not contained within a contract for other countries, and vice versa.

Sometimes, the first draft of a document may not be satisfactory. For example, in the case of a contract between various parties, one or more of the parties may not be satisfied with one or more of the clauses in the contract. This may be resolved by negotiations between the parties, resulting in amendments being made to the contract. In many cases, the amendments may be extensive, resulting in word changes being made throughout the document. Some clauses may be deleted and others added. The amendment process may also be performed manually. Amending a first draft of a document results in a second draft of the document.

Subsequently, a customised document using modified document generation data may be required. For example, where a contract governed by a particular law, such as the United States, has been generated, an equivalent contract governed under a different law, such as the United Kingdom may be required. In this case, the document generation data could be amended to specify the United Kingdom rather than the United States as the governing law, and the document generation system used to generate a new customised document using the modified document generation data. This document represents a first draft of the customised document generated from the modified document generation data. However, this document would not include the amendments made to the first draft of the document generated using the original document generation data. It would therefore be necessary to amend the first draft of the document generated using the modified document generation data in a similar manner as previously to produce a second draft. However, this process may be difficult and time consuming, particularly where the amendments are extensive and made manually.

We have appreciated that, where a first document generated using a first set of document generation data has been amended, it is useful to have a system which facilitates the generation of a second document generated using a second set of document generation data incorporating the same amendments.

DETAILED DESCRIPTION OF PREFERRED EMBODIMENTS

Figure 1:
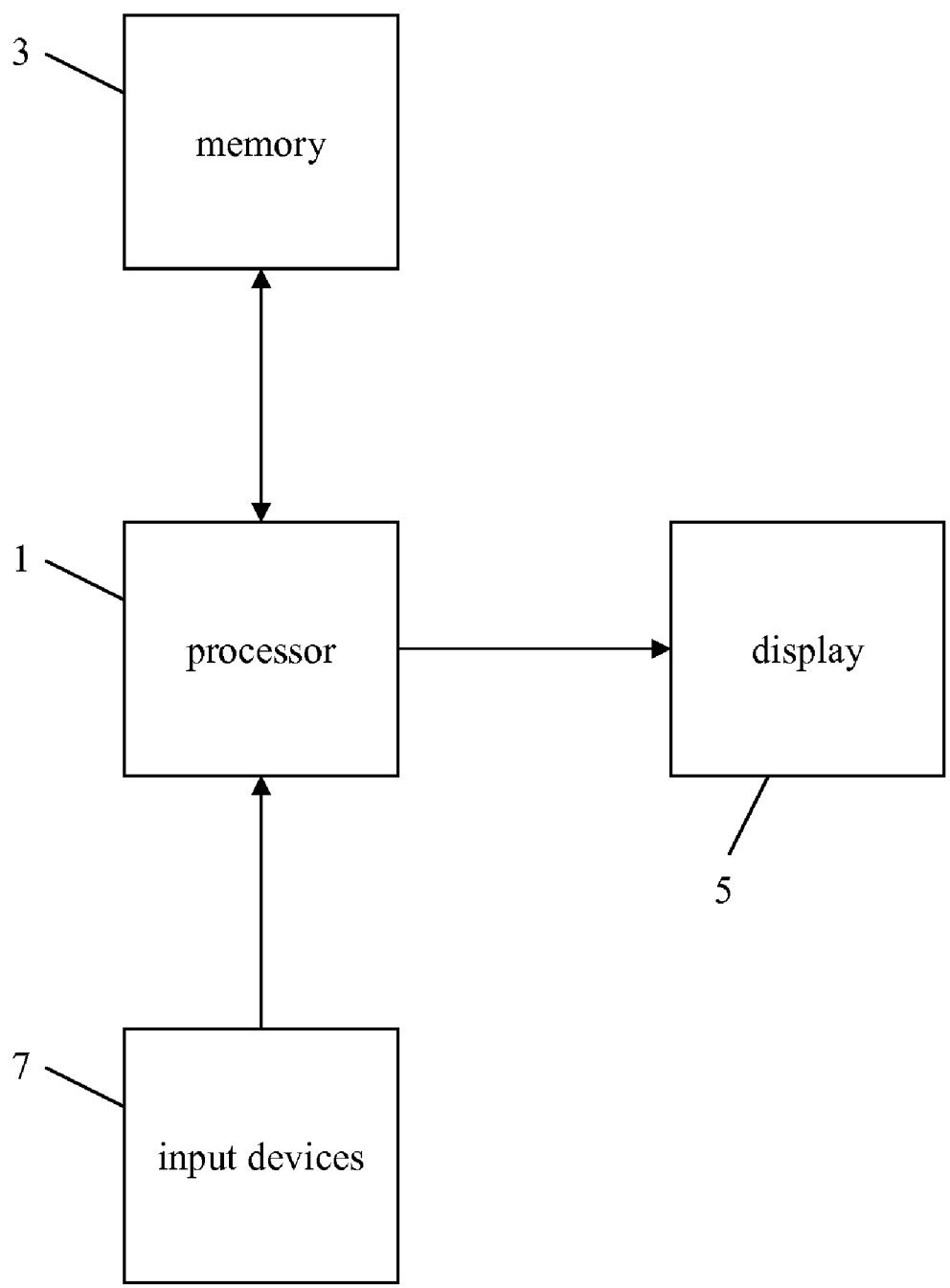
FIG. 1 is a schematic diagram of a system according to the present invention.
Figure 2:
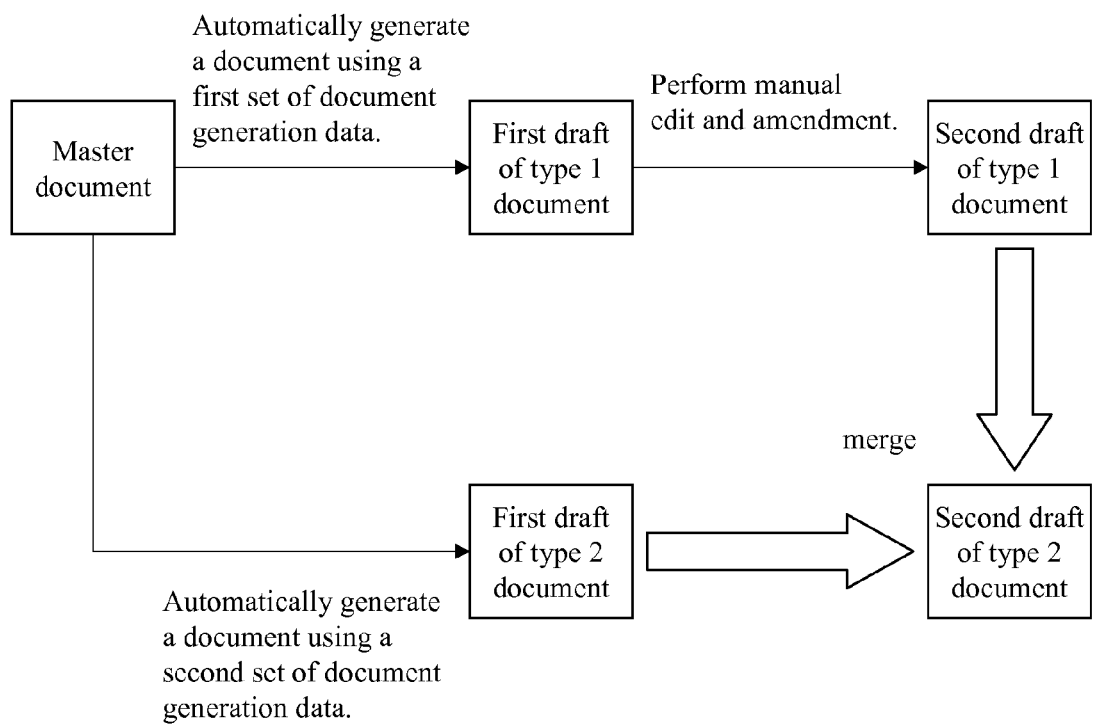
FIG. 2 is a schematic diagram of processes used to generate amended customised documents.

For convenience, a document generated according to a first set of document generation data may be referred to as a 'type 1' document and a document generated according to a second set of document generation data may be referred to as a 'type 2' document. For example, a contract governed by the laws of the United States is a type 1 document, while an equivalent contract governed by the laws of the United Kingdom is a type 2 document. This contract example is used in the description below, although the skilled person would understand that the invention is applicable to other types of document.

Where a first draft of a type 1 document has been amended to produce a second draft of the type 1 document, the present invention facilitates the generation of a second draft of a type 2 document incorporating the amendments. In order to achieve this, the second draft of the type 1 document incorporating the amendments is merged with the first draft of the type 2 document generated automatically by the document generation system.

The amendments made to a document such as a contract may be in the form of deleting existing clauses from the document, inserting new clauses into the document and replacing existing clauses with alternative clauses. The new and alternative clauses are clauses that appear within the original master document but which were not selected for inclusion into the customised document.

Where the first draft of a type 1 document is manually amended to produce a second draft by deleting an existing clause, the first draft of the type 2 document may be similarly amended by deleting the text of the corresponding clause. However, it may be difficult to identify where in the document the clause text occurs as the clause may have been moved during the manual edit of the type 1 document so that the clause occurs in different places in the type 1 and type 2 documents. The clause may have even been deleted already.

Where the first draft of a type 1 document is manually amended to produce a second draft by inserting a new clause, the first draft of the type 2 document may be similarly amended by inserting the new clause text at the appropriate place. It may be important that the new clause is inserted into the type 2 document within the same context as it appeared in the original master document. For example, a termination clause must be inserted within the termination section of the document. However, this section may have been moved during the manual amendment process and so it may be difficult to determine where to insert the new clause.

The replacement of existing clauses with alternative clauses may be considered to be a combination of the above processes of deleting an exiting clause and inserting a new clause at the same location in the document.

One method to generate a second draft of the type 2 document would be to record the amendments made to the first draft of the type 1 document. The recoded amendments could then be applied automatically to the first draft of the type 2 document generated by the document generation system.

This process corresponds to merging the second draft of the type 1 document into the first draft of the type 2 document. However, this approach can be problematic as it relies on the software used to perform the amendments to keep a perfect and complete set of changes. Furthermore, those changes may involve strategic movement of sections of text that have not been identified as clauses. For example, some standard definitions may be moved from the beginning of the document to elsewhere in the document.

In order to avoid the requirement of recording amendments made to documents in the approach described above, an alternative approach may be used corresponding to merging the first draft of the type 2 document into the second draft of the type 1 document.

As described above, when a customised document is generated, particular portions of document content in the master document are selected and included in the customised document. Other portions of document content in the master document are not selected and not included in the customised document. In a document generation system according to the present invention, when a customised document is generated, additional information is stored indicating which portions of document content have, and have not, been included in the customised document. The information also specifies the location and span of those portions of document content included in the customised document. For those portions of document content not included in the customised document, the information further specifies the location at which these would have occurred, if they had been included in the document.

In the examples described below, the information mentioned above is contained within the customised document. However, the skilled person would understand that the information could be stored in different ways, including separate from the document itself.

In order to identify portions of document content, each individual portion of document in the master document is associated with a unique identifier such as a unique number or other code. For example, a first portion of document content may be identified by the tag <1> and a second portion of document content may be identified by the tag <2>.

A particular portion of document content may be identified as having been included or excluded from the customised document by specifying 'included' or 'excluded' within the identification tag. For example, if the first portion of document content is included in, and the second portion of document content is excluded from, a customised document, this may be represented by the identification tags <1; included> and <2; excluded>.

In order to identify the location of a particular portion of document content within a customised document, the identification tag corresponding to a particular portion of document content may be inserted into the document at the location at which the document content appears, or would have appeared had it been included. In order to indicate the span of a particular portion of document content, two identification tags for the document content may be used, the first specifying the start of the document content and the second specifying the end. An identification tag may explicitly indicate whether that tag represents the start or end of a portion of document content by specifying 'start' or 'end' within the identification tag. For example, the document may contain the following identification tags.

<1; included; start>First portion of document content . . . <1; included; end>

It is important that when a document is amended, the information specifying the location and span of portions of document content and whether each was included in, or excluded from, the document is not removed. This does not mean that the location or span of a clause cannot be changed, but that when the location or span of a clause is changed, the corresponding information is updated.

Figure 3:
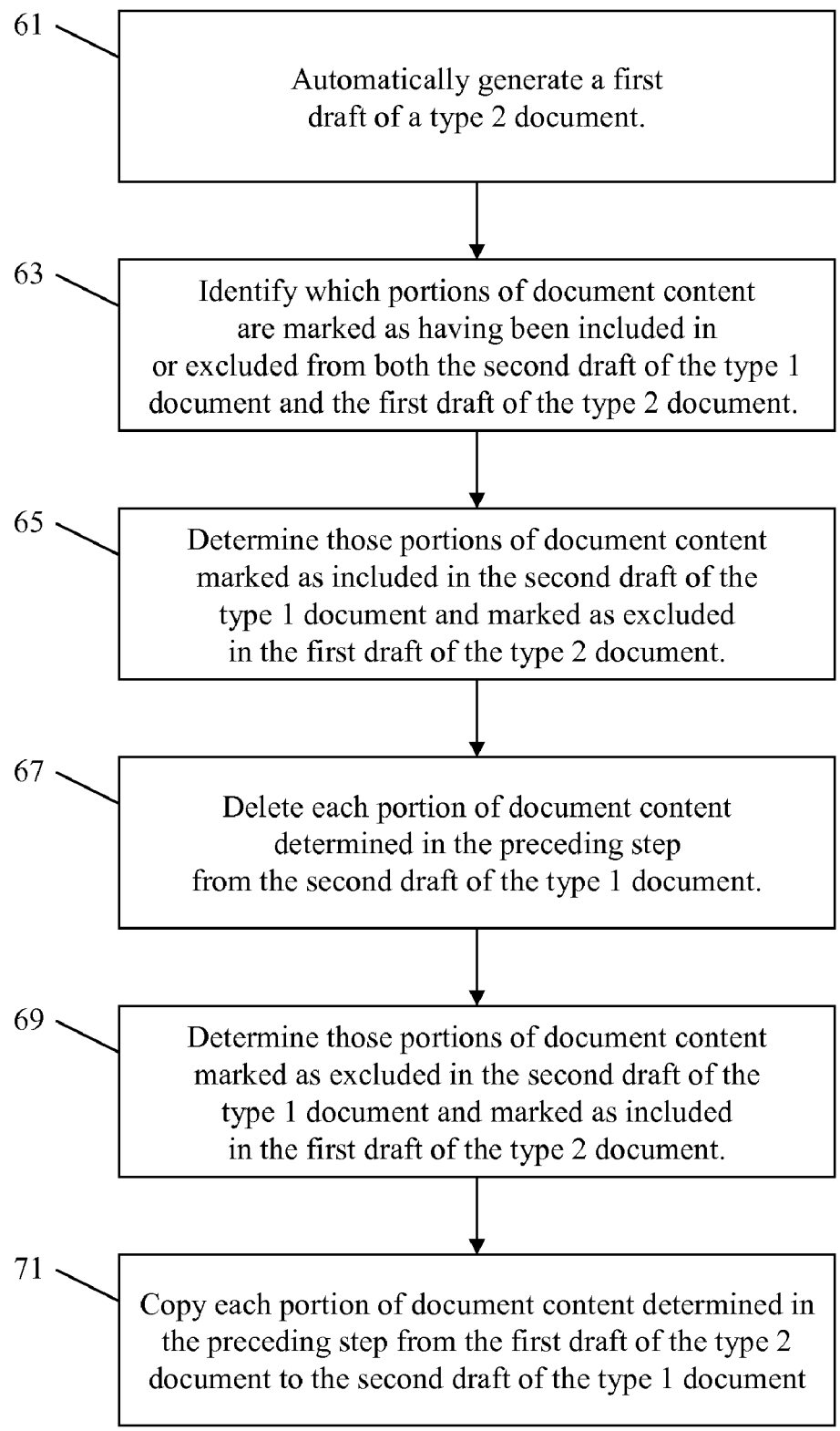
FIG. 3 is a flow chart of a method according to the present invention.

In a typical process a first draft of a type 1 document is automatically generated by the document generation system. Then, the first draft of the type 1 document is amended manually to generate a second draft of the type 1 document. In order to generate a type 2 document incorporating the amendments the process described below and illustrated in FIG. 3 may be carried out. In a first step 61, a first draft of a type 2 document is automatically generated by the document generation system.

In a next step 63, the system identifies which portions of document content are marked as having been included in or excluded from both the second draft of the type 1 document and the first draft of the type 2 document.

In a next step 65, those portions of document content marked as included in the second draft of the type 1 document and marked as excluded in the first draft of the type 2 document are determined. This may be achieved for example by searching the documents for the identification tags. For a particular portion of document content, the corresponding identification tag is found in each of the documents. Then, the information contained in the identification tags are used to determine whether the portion of document content is marked as included in the second draft of the type 1 document and marked as excluded in the first draft of the type 2 document.

In a next step 67, each portion of document content determined in the preceding step 65 is then deleted from the second draft of the type 1 document. The location and span of the portion of document content to be deleted are determined using the identification tags. When the portion of document content is deleted, the identification tag is modified accordingly to specify the document content as excluded.

In a next step 69, those portions of document content marked as excluded in the second draft of the type 1 document and marked as included in the first draft of the type 2 document are determined. As in the previous step 65, this may be achieved by searching the documents for the identification tags and using the information contained in them.

In a next step 71, each portion of document content determined in the preceding step 69 is copied from the first draft of the type 2 document and copied to the second draft of the type 1 document. The location and span of text copied and the location to which the document content is copied are determined using the identification tags. When the document content is copied, the identification tag is modified accordingly to specify the document content as included. An additional identification tag is also created to allow the span of the document content to be specified.

In the above process, as information is provided which allows the location of clauses to be determined, the location of clauses in the second draft of the type 1 document need not be the same of the location of the clause in the first draft of the type 2 document. This allows clauses to be moved around freely during the document amendment process.

After the above process has been carried out, the second draft of the type 1 document as modified in the process by the deletion and insertion of clauses represents a second draft of the type 2 document.

Although the invention has been described above in relation to first and second drafts of documents, the invention is applicable to the process of further amending of documents to generate third, fourth and subsequent drafts of documents. In general, the present invention facilitates the ability to maintain manual edits or amendments of documents whilst automatically re-generating various versions of documents using different document generation data.

The present invention may be implemented on any suitable computer system. One suitable computer system, illustrated in FIG. 1, comprises a processor 1, a memory 3, a display 5 such as a VDU, and one or more input devices 7 such as a keyboard and mouse. The memory 3 is arranged to store various data used in the system, and computer executable code which is executed by the processor 1 to perform various method steps and other processes. The display 5 is used to present a user interface and any other visual information to a user. The input devices 7 may be used to input information into the system.

A master document stored as a file may be stored and retrieved using any suitable file storage and retrieval system. The user retrieves a master document which may then be presented to the user on the user interface. If it is desired to generate a customised document from the master document, the user selects a 'generate customised document' icon causing the processor 1 to process the master document. The system then generates a questionnaire by analysing the master document and displays the questionnaire to the user for input of information.

The resulting questionnaire may be in the form of a web page created using HTML for example. The questionnaire may be completed by inputting various information in response to a series of questions presented on the display 5. The user may input information using the input devices 7 for example by typing text into text boxes, by selecting buttons corresponding to different options and so on. The user may also navigate forwards and backwards through the questionnaire amending their answers to the questions. In some embodiments, the questionnaire web page may be accessed independently from several computers connected together by a network. This allows different users to complete different parts of the questionnaire more easily. In some embodiments, the information required to answer some questions may be provided from an external database or other information source.

Once the user has completed the questionnaire, a customised document may be generated using the information collected in the questionnaire. In particular, the usage statements in the master document are evaluated using the values of the variables collected via the questionnaire. Conditional portions of document content are then selected for inclusion in the customised document according to the results of the evaluation of the usage statement. A customised document is then created and the selected portions of document content inserted into it.

A master document used in the system may be implemented for example in the form of a Microsoft Word document. The mark-up used in the master documents may be represented for example by the formatting features of Microsoft Word such as superscript.

The invention claimed is:

1. A method comprising:
    generating a first customized document including conditional and non-conditional content;
    generating a second customized document including conditional and non-conditional content; and
    generating an amended second customized document incorporating amendments made to the first customized document resulting in an amended first customized document, including the steps of:
        determining which portions of document content are comprised in the amended first customized document but which are not comprised in the second customized document;
        deleting the portions of document content determined in the preceding step from the amended first customized document;
        determining which portions of document content are comprised in the second customized document but which are not comprised in the amended first customized document;
        copying the portions of document content determined in the preceding step from the second customized document to the amended first customized document; and
        outputting the resulting amended first customized document as the amended second customized document.

2. The method of claim 1 in which the amended first customized document and the second customized document are associated with inclusion information indicating whether each portion of document content is included in, or excluded from, the respective document.

3. The method of claim 2 in which the step of determining which portions of document content are comprised in the amended first customized document but which are not comprised in the second customized document comprises the step of comparing the inclusion information associated with each document.

4. The method of claim 3 comprising the further step of modifying the inclusion information associated with the amended first customized document to indicate that the portions of document content which have been deleted are excluded from the amended first customized document.

5. The method of claim 2 in which the step of determining which portions of document content are comprised in the second customized document but which are not comprised in the amended first customized document comprises the step of comparing the inclusion information associated with each document.

6. The method of claim 5 comprising the further step of modifying the inclusion information associated with the amended first customized document to indicate that the portions of document content which have been copied from the second customized document are included in the amended first customized document.

7. The method of claim 2 in which each portion of document content is associated with one or more identification tags.

8. The method of claim 7 in which each identification tag comprises information uniquely identifying the portion of document content associated with each identification tag.

9. The method of claim 7 in which the inclusion information is comprised in the identification tags.

10. The method of claim 7 in which the location information is defined by the location of the identification tags within a document.

11. The method of claim 7 in which the span information is represented by a pair of identification tags, the pair of identification tags defining the span of the portion of document content associated with the identification tags.

12. The method of claim 1 in which each document is associated with location information indicating the location of each portion of document content within the document.

13. The method of claim 12 in which the step of deleting the portions of document content from the amended first customized document comprises the step of using the location information associated with the amended first customized document to locate the portions of document content in the amended first customized document to be deleted.

14. The method of claim 12 in which the step of copying the portions of document content from the second customized document to the amended first customized document comprises the step of using the location information associated with the second customized document to locate the portions of document content in the second customized document to be copied.

15. The method of claim 12 in which the step of copying the portions of document content from the second customized document to the amended first customized document comprises the step of using the location information associated with the amended first customized document to determine the location in the amended first customized document to which the portions of document content should be copied.

16. The method of claim 1 in which the amended first customized document and the second customized document are associated with span information indicating the span of each portion of document content within the respective document.

17. The method of claim 16 in which the step of deleting the portions of document content from the amended first customized document comprises the step of using the span information associated with the amended first customized document to determine the spans of the portions of document content in the amended first customized document to be deleted.

18. The method of claim 16 in which the step of copying the portions of document content from the second customized document to the amended first customized document comprises the step of using the span information associated with the second customized document to determine the spans of the portions of document content in the second customized document to be copied.

19. The method of claim 1 in which the documents are legal contracts.

20. A computer program product comprising a non-transitory computer readable medium having stored thereon program instructions which when run on a computer causes the computer to perform the steps comprising:
   generating a first customized document including conditional and non-conditional content;
   generating a second customized document including conditional and non-conditional content; and
   generating an amended second customized document incorporating amendments made to the first customized document resulting in an amended first customized document, including the steps of:
   determining which portions of document content are comprised in an amended first customized document but which are not comprised in a second customized document;
   deleting the portions of document content determined in the preceding step from the amended first customized document;
   determining which portions of document content are comprised in the second customized document but which are not comprised in the amended first customized document;
   copying the portions of document content determined in the preceding step from the second customized document to the amended first customized document; and
   outputting the resulting amended first customized document as an amended second customized document.

* * * * *